(12) United States Patent
Wang et al.

(10) Patent No.: US 10,462,461 B2
(45) Date of Patent: Oct. 29, 2019

(54) CODING DEVICE AND DECODING DEVICE WHICH ALLOW ENCODING OF NON-SQUARE BLOCKS

(71) Applicant: KDDI CORPORATION, Tokyo (JP)

(72) Inventors: Cui Wang, Tokyo (JP); Kei Kawamura, Tokyo (JP); Sei Naito, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 15/551,739

(22) PCT Filed: Dec. 22, 2015

(86) PCT No.: PCT/JP2015/085740
§ 371 (c)(1),
(2) Date: Aug. 17, 2017

(87) PCT Pub. No.: WO2016/136106
PCT Pub. Date: Sep. 1, 2016

(65) Prior Publication Data
US 2018/0020214 A1    Jan. 18, 2018

(30) Foreign Application Priority Data
Feb. 27, 2015    (JP) .................................. 2015-038593

(51) Int. Cl.
*H04N 7/12*    (2006.01)
*H04N 11/02*    (2006.01)
(Continued)

(52) U.S. Cl.
CPC ......... *H04N 19/119* (2014.11); *H04N 19/124* (2014.11); *H04N 19/129* (2014.11);
(Continued)

(58) Field of Classification Search
None
See application file for complete search history.

(56) References Cited

U.S. PATENT DOCUMENTS

2011/0158315 A1*  6/2011  Kim ..................... H04N 19/124
                                                    375/240.03
2011/0176607 A1   7/2011  Hayoon et al.
(Continued)

FOREIGN PATENT DOCUMENTS

CN    101282485 A    10/2008
CN    103636215 A    3/2014
(Continued)

OTHER PUBLICATIONS

Extended European Search Report for European Application No. 15883396.2 dated Jul. 26, 2018.
(Continued)

*Primary Examiner* — Chikaodili E Anyikire
(74) *Attorney, Agent, or Firm* — Greenblum & Bernstein, P.L.C.

(57) ABSTRACT

An encoding device includes means for determining a block division type and an intra prediction mode, means for applying non-square intra prediction to obtain a predictive value when the determined block is non-square, means for obtaining a prediction residual which is the difference between the predictive value and a corresponding input image to be encoded, means for rearranging prediction residuals obtained when the determined block is non-square into a square format, means for applying orthogonal transformation to the prediction residuals rearranged into the square format to obtain a transform coefficient, means for quantizing the transform coefficients to obtain level values, means for encoding the level values, the block division type, and the intra prediction mode, means for inversely quantizing and inversely transforming the level values to obtain
(Continued)

reconstructed prediction residuals, and means for rearranging a block of the reconstructed prediction residuals into a non-square format.

9 Claims, 9 Drawing Sheets

(51) Int. Cl.

| H04N 11/04 | (2006.01) |
|---|---|
| H04N 19/119 | (2014.01) |
| H04N 19/176 | (2014.01) |
| H04N 19/129 | (2014.01) |
| H04N 19/61 | (2014.01) |
| H04N 19/593 | (2014.01) |
| H04N 19/157 | (2014.01) |
| H04N 19/124 | (2014.01) |
| H04N 19/159 | (2014.01) |
| H04N 19/13 | (2014.01) |

(52) U.S. Cl.
CPC ......... *H04N 19/157* (2014.11); *H04N 19/159* (2014.11); *H04N 19/176* (2014.11); *H04N 19/593* (2014.11); *H04N 19/61* (2014.11); *H04N 19/13* (2014.11)

(56) References Cited

U.S. PATENT DOCUMENTS

| 2012/0300850 A1* | 11/2012 | Yie | H04N 19/105 |
| | | | 375/240.16 |
| 2012/0320974 A1* | 12/2012 | Li | H04N 19/159 |
| | | | 375/240.12 |
| 2013/0129237 A1* | 5/2013 | Yie | G06T 9/004 |
| | | | 382/233 |
| 2013/0301707 A1 | 11/2013 | Changcai et al. | |
| 2014/0092965 A1* | 4/2014 | Joshi | H04N 19/176 |
| | | | 375/240.12 |
| 2014/0341306 A1 | 11/2014 | Hendry et al. | |

FOREIGN PATENT DOCUMENTS

| CN | 104285445 A | 1/2015 |
| JP | 2014-534751 A | 12/2014 |
| WO | 2010/045033 A2 | 4/2010 |
| WO | 2013/063245 A1 | 5/2013 |
| WO | 2013/064099 A1 | 5/2013 |
| WO | 2013/160693 A2 | 10/2013 |
| WO | 2014/071439 A1 | 5/2014 |

OTHER PUBLICATIONS

Rosewarne (CISRA) C et al: "AHG7: Transforms for extended chroma formats", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/ No. JCTVC-K0171, Oct. 1, 2012 (Oct. 1, 2012), p. 1-3.
Cao et al., "CE6.b Report on Short Distance Intra Prediction Method", 4th Meeting: Daegu, KR, Jan. 20-28, 2011, pp. 1-8.
Cohen et al., "Direction-Adaptive Transforms for Coding Prediction Residuals", IEEE 17th International Conference on Image Processing (IPIP 2010), Sep. 26-29, 2010, pp. 185-188.
Yuan et al., "Non-Square Quadtree Transform Structure for HEVC", 2012 Picture Coding Symposium, May 7-9, 2012, pp. 505-508, Krakow, Poland.
Search Report issued in International Bureau of WIPO Patent Application No. PCT/JP2015/085740, dated Feb. 9, 2016.
Chinese Office Action dated Jun. 5, 2019 issued for Chinese patent application No. 201580076643.7 along with a partial English translation thereof.
Japanese Office Action issued in Japanese Application No. 2017-501874 dated Aug. 6, 2019, together with an English language translation.

\* cited by examiner

LEVEL 0
[2N×2N]

LEVEL 1
[2N×0.5N]

LEVEL 2
[N×0.25N]

LEVEL 0
[2N×2N]

LEVEL 1
[2N×0.5N]

LEVEL 2
[N×0.25N]

CODING DEVICE AND DECODING DEVICE WHICH ALLOW ENCODING OF NON-SQUARE BLOCKS

TECHNICAL FIELD

The present invention relates to still image or video encoding and decoding devices which allow encoding of non-square blocks.

BACKGROUND ART

In a video encoding method typified by H.264 and H.265, intra-frame prediction is performed such that pixel values in relevant blocks as predicted in units of square blocks using pixels of neighboring blocks, have already been encoded and decoded, as reference pixel. After residual signals between pixel values and infra-predictive values are orthogonally transformed/quantized, coefficient scanning is applied, entropy encoding is performed, and thereby a bitstream is generated.

Non Patent Documents 1 and 3 and Patent Document 1 propose an approach in which non-square blocks are added to a conventional international standard encoding scheme and, after residual signals between pixel values and intra-predictive values are orthogonally transformed/quantized on a non-square basis, their coefficients are rearranged into a square format, coefficient scanning is then applied to conventional square blocks, and entropy encoding is performed.

Non Patent Document 2 proposes a direction-adaptive residual transform (hereinafter appropriately referred to as DART) based on intra-prediction modes instead of the conventional separation type DCT.

PRIOR ART DOCUMENT

[Patent Document]
Patent Document 1: PCT International Publication No. WO 2013/063245

[Non Patent Document]
Non Patent Document 1: Yuan Yuan, Xiaozhen Zheng, Lingzhi Liu, Xiaoran Cao and Yun He, "Non-Square Quadtree Transform Structure for HEVC," 2012 Picture Coding Symposium, May 7-9, 2012, Krakow, Poland.
Non Patent Document 2: Robert A. Cohen, Sven Klomp, Anthony Vetro, and HuifangSun, "DIRECTION-ADAPTIVE TRANSFORMS FOR CODING PREDICTION RESIDUALS," IEEE International Conference on Image Processing 2010 (ICIP 2010)
Non Patent Document 3: Xiaoran Cao, Xiulian Peng, Changcai Lai Yunfei Wang, Yongbing Lin, Jizheng Xu, Lingzhi Liu, Jianhua Zheng, Yun He, Haoping Yu and Feng Wu, "CE6.b Report on Short Distance Infra Prediction Method," Doc. JCT-VC D299, 4th Meeting: Daegu, K R, 20-28 Jan. 2011.

DISCLOSURE OF INVENTION

Problems to be Solved by the Invention

Hereinafter, an overview of a related technology will be described with reference to FIGS. 1 to 4 for the related technology which handles non-square blocks and with reference to FIGS. 5 and 6 for DART.

FIGS. 1 and 2 are functional block diagrams of an encoding device and a decoding device tot performing intra-frame prediction proposed in Non Patent Document 3, respectively. FIGS. 3 and 4 are diagrams for explaining quadtree division orthogonal transformation used in Non Patent Document 3 and proposed in Non Patent Documents 1 and 3.

An encoding device 300 has functional units as shown in FIG. 1, each of which functions as follows.

Inputs of a mode selection unit 301 are an input image to be encoded and a reference pixel stored in an encoded block buffer 343. The mode selection unit 301 determines block division (regarding whether it is square or non-square and the block size) and a prediction mode on the basis of a rate distortion optimization algorithm. Outputs of the mode selection unit 301 are a block division type and a prediction mode of each divided block (square or non-square blocks), which are output to a mode information buffer 302 and a square (non-square) intra prediction unit 311 (321).

Of pixels of the input image, those divided into square blocks as a result of the determination of the mode selection unit 301 are output to the square intra prediction unit 311 and those divided into non-square blocks as a result of the determination are output to the non-square intra prediction unit 321.

In this manner, in the related technology, processing is performed separately in the case of a square block and in the case of a non-square block according to case discrimination therebetween as shown in FIG. 1 and therefore it is possible to handle non-square blocks, thereby improving the encoding efficiency. A switch 340 switches square/non-square pixel signals according to the case discrimination.

That is, in the case of a square block, processes are performed sequentially by the square intra prediction unit 311, a differential unit 312, a square DCT unit 313, a quantization unit 332, an entropy encoding unit 333, an inverse quantization unit 334, the switch 340, a square IDCT unit 351, an adder 341, and an encoded block buffer 343 as shown in the figure. Processes in the case of a square block are the same as those in the case of normal intra prediction of H.264 or H.265.

On the other hand, in the case of a non-square block, processes are performed sequentially by the non-square intra prediction unit 321, a differential unit 322, a non-square DCT unit 323, a squaring unit 324, the quantization unit 312, the entropy encoding unit 333, the inverse quantitation unit 334, the switch 340, a non-squaring unit 350, a non-square IDCT unit 352, an adder 342, and the encoded block buffer 343 as shown in the figure.

Accordingly, also in the case of anon-square block, the quantization unit 332 and the inverse quantization unit 334, provided between the squaring unit 324 and the non-squaring unit 350, and the entropy encoding unit 333 perform processes common to the case of a square block. This is because non-square blocks have been rearranged into square blocks when they are at the locations of these units.

In addition, in terms of form, the case of a non-square block is different from the case of a square block in that rearrangement is performed through processes of the two components, the squaring unit 324 and the non-squaring unit 350, but the other processes are, in terms of form, in a parallel, correspondence relationship with those of the case of a square block. For example, a square block is processed by the square intra prediction unit 311 and, in the case of a non-square block, a corresponding process is performed by the non-square intra prediction unit 321. Hereinafter, processes in such a correspondence relationship will be described in parallel by adding, reference numerals and others in parentheses.

Inputs of the square (non-square) intra prediction unit 311 (321) are a prediction mode, an input image, and reference pixels stored in the encoded block buffer 343. The square (non-square) infra prediction unit 311 (321) generates a predictive value according to an optimal prediction method on the basis of a rate distortion optimization algorithm for a square (non-square) block. An output of the square (non-square) intra prediction unit 311 (321) is a predictive value, which is output to the differential unit 312 (322) and the adder 341 (342).

The differential unit 312 (322) obtains a difference between the predictive value output from the square (non-square) intra, prediction unit 311 (321) and a pixel of the block to which the prediction has been applied in those of the input image to be encoded as a prediction residual and outputs the prediction residual to the square (non-square) DCT unit 313 (323).

An input of the square DCT unit 313 is the prediction residual between the input image and the predictive value output from the differential unite 312. An output of the square DCT unit 313 is a coefficient orthogonally transformed through a two-dimensional square discrete cosine transform (DCT), which is output to the quantization unit 332.

An input of the non-square unit 323 is the prediction residual between the input image and the predictive value output from the differential unit 322. The non-square DCT unit 323 applies orthogonal transformation of a two-dimensional non-square DCT. An output of the non-square DCT unit 323 is a coefficient orthogonally transformed through a two-dimension nota-square DCT, which is output to the squaring unit 324.

In terms of form, the process of the square (non-square) DCT unit 313 (323) can be represented uniformly by the following equation (1). $B_{N \times M}$ is a prediction residual of a block of size N×M, $C_{N \times M}$ is a DCT transformed coefficient, and $T_M$ and $T_N$ are transformation bases of size M×M and N×N, respectively. Equation (1) represents a square DCT when N=M. In other cases (N≠M), Equation (1) represents the process of non-square DCT.

$$C_{N \times M} = T_M \times B_{N \times M} \times T_N^T \quad (1)$$

In order to use a conventional quantization table also for non-square orthogonal transform coefficients, the squaring unit 324 applies a corresponding rearrangement operation to a non-square coefficient block obtained through non-square orthogonal transformation. Thus, the orthogonal transform coefficients of the non-square block output from the non-square DCT unit 323 are input to the squaring unit 324 as an input thereof. The squaring unit 324 outputs a square block of rearranged transform coefficients as an output thereof to the quantization unit 332.

This has the following problems. That is, since coefficients are rearranged into a square format after they are orthogonally transformed, there is room for improvement in the energy compaction performance of the orthogonal transform coefficients.

The quantization unit 332 quantizes the transform coefficients. The coefficients of the square block output from the square DCT unit 313 or the squaring unit 324 are input to the quantization unit 332 as an input thereof. The quantization unit 332 outputs level values obtained by quantizing the square block coefficients as an output thereof to the inverse quantization unit 334 and the entropy encoding unit 333.

The entropy encoding unit 113 entropy-encodes the level values to generate a bitstream. The level values output from the quantization unit 332 and mode information stored in the mode information buffer 302 are input to the entropy encoding unit 333 as inputs thereof. The entropy encoding unit 333 outputs the entropy-encoded bitstream an output thereof. This output is input to a decoding device 400 of FIG. 2.

The inverse quantization unit 334 inversely quantizes level values. The level values output from the quantization unit 332 are input to the inverse quantization unit 334 as an input thereof. The inverse quantization unit 334 outputs coefficients of a square block as an output thereof to the switch 340.

The switch 340 determines whether rearrangement into a non-square format is necessary depending on the division type of the block stored the mode information buffer 302. When the division type of the block is square, the switch 340 determines that rearrangement is unnecessary and outputs the coefficients of the square block output from the inverse quantization unit 334 to the square IDCT unit 351. On the other hand, when the division type of the block is non-square, the switch 340 determines that rearrangement is necessary and outputs the coefficients of the square block output from the inverse quantization unit 334 to the non-squaring unit 350.

The non-squaring unit 350 applies a rearrangement operation from a square format into a non-square form and then outputs coefficients of the non-square block to the non-square IDCT unit 352.

The square inverse discrete cosine transform (IDCT) unit 351 performs inverse orthogonal transformation of a two-dimensional square DCT. The coefficients of the square block sent from the switch 340 are input to the square IDCT unit 351 as an input thereof. The square IDCT unit 351 outputs reconstructed prediction residuals as an output thereof to the adder 341.

The non-square IDCT unit 352 performs inverse orthogonal transformation of a two-dimensional non-square DCT on a non-square block. The coefficients of the non-square block output from the non-square unit 350 are input to the non-square IDCT unit 352 as input thereof. The non-square IDCT unit 352 outputs reconstructed prediction residuals as an output thereof the adder 342.

The adder 341 (342) adds a prediction residual output from the square (non-square) unit 351 (352) and a predictive value output from the square (non-square) intra prediction unit 311 (321) to obtain a reconstructed signal and stores the reconstructed signal in the encoded block buffer 143.

The encoding device 300 of FIG. 1 has been described above and thus the decoding device 400 of FIG. 2 corresponding thereto will now be described.

An entropy decoding unit 433 in FIG. 2 decodes a division type, a prediction mode, and a level value from a bitstream. The bitstream output from the entropy encoding unit 333 of FIG. 1 is input to the entropy decoding unit 433 as an input thereof. The entropy decoding unit 433 outputs the division type, the prediction mode, and the level value as outputs thereof to a mode information buffer 402 and a predictive value generation unit 444.

The mode information buffer 402 receives the division type and the prediction mode and outputs the same to the predictive value generation unit 444 and a switch 440.

An inverse quantization unit 434 performs the same process as the inverse quantization unit 334 of FIG. 1 on level values output from the entropy decoding unit 433 and outputs coefficients of a square block to the switch 440.

Processes of the switch 440, a square IDCT unit 451, an adder 441, a non-squaring unit 450, a non-squaring IDCT unit 452, an adder 442, and a memory 443 in FIG. 2 are common to the processes of the switch 340, the square IDCT unit 351, the adder 341, the non-squaring unit 350, the non-square IDCT unit 352, the adder 342, and the encoded block buffer 343 as they are denoted by corresponding reference numerals (300s in FIG. 1 and 400s in FIG. 2 with two common lower digits) and therefore duplicate descriptions thereof are omitted. In this manner, processing is performed separately in the case in which the division type of the decoded block is square and in the case in which the division type of the decoded block is non-square according to case discrimination therebetween.

That is, upon determining that the division type of the block is square through the mode information buffer 402, the switch 440 outputs the output of the inverse quantization unit 434 to the square IDCT unit 451, and upon determining that the division type of the block is non-square, the switch 440 outputs the output of the inverse quantization unit 434 to the non-squaring unit 450.

As a different configuration from the encoding device, a predictive value generation unit 444 generates predictive values of the block to be sent to the adders 441 and 442. Here, the predictive value generation unit 444 generates the predictive values with reference to decoded pixels stored in the memory 443 according to the prediction mode output from the entropy decoding unit 433. In this manner, the predictive value generation unit 444 generates predictive values similar to those generated by the square intra prediction unit 311 or the non-square intra prediction unit 321 in FIG. 1.

The decoding device 400 of FIG. 2 has been described above. Hereinafter, details of the mode selection unit 301 in FIG. 1 will be described.

FIGS. 3 and 4 are diagrams for explaining the cases where block division (quadtree division orthogonal transformation) selected by the mode selection unit 301 is horizontal division and vertical division, respectively.

In the horizontal division method of FIG. 3, dividing a block into non-square blocks in a horizontal direction reduces the energy of residual signals when a correlation in the horizontal direction (a correlation between subblocks divided in the horizontal direction) in a 2N×2N block at level 0 is high. Therefore, a block is divided into a plurality of non-square 2N×hN blocks as shown at level 1. In the shown example, at level 1, h=0.5 and a block is divided into four. Further, if it includes a liner texture, each 2N×hN subblock is divided into smaller N×qN subblocks as shown at level 2. In the shown example, at level 2, q=0.25 and subblock is divided into four.

FIG. 4 shows an example in which the same division as in FIG. 3 is performed in a vertical direction. The division of FIG. 4 reduces the energy of residual signals when a correlation in the vertical direction (a correlation between subblocks divided in the vertical direction) in a block of 2N×2N is high.

In addition to 4-division as shown in FIG. 3 or 4, division into various predetermined sizes is possible and the block division can be expressed by a graph structure (a tree structure). However, by setting division such that, when a block is divided into non-square blocks, it is always divided into 4 subblocks, it is possible to simply express the tree structure.

For example, non-square block sizes disclosed in Non Patent Document 1 and Patent Document 1 are of the following listed types under the setting in which, when a block is divided into subblocks, it is always divided into four subblocks and, by further continuing the division of FIG. 3 or 4, it is also possible to achieve division into such finer non-square blocks.

(Examples of Non-Square Block Size)

32×8, 8×32, 32×2, 2×32, 16×4, 4×16, 16×1, 1×16, 8×2, 2×8

Predetermined candidates are set as candidates for patterns of division into non-square blocks as described above. More specifically, the mode selection unit 301 of the encoding device 300 attempts encoding by applying each prediction to each candidate division, and then which division and prediction are to be applied is determined according to the rate distortion optimization algorithm using a series of results of the encoding described above.

FIGS. 5 and 6 are diagrams for explaining DART proposed in Non Patent Document 2.

Specifically, DART focuses on the following property. That is, an intra-prediction residual signal (square) block of N×N size has a property that the correlation coefficient is high also in the direction of the prediction mode. Focusing on this property, the following two-stage one-dimensional DCT is performed.

As the first stage, a one-dimensional DCT is performed in one of horizontal, vertical, and oblique directions (in the direction of a prediction mode) along primary paths. FIG. 5 shows the case where the directions of DCT performed in the primary paths are 0°, 45°, 135° (assuming that the downward vertical direction is 0° as a reference). Directions 0, 4 and 12 written in the figure are numbers representing the respective prediction directions, $C_0, C_1, \ldots, C_{M/2}, \ldots, C_{M-1}$ and the like indicated by arrows are the primary paths for which DCT coefficients are to be calculated. When the direction of DCT is 0°, the square size N is M (N=M), and when the DCT directions are 45° and 135°, the square size N is M/2 (N=M/2).

As the second stage, a one-dimensional DCT is further applied along secondary paths only to DC coefficients output at the first stage. In FIG. 6, 0° and 45° indicate secondary paths corresponding to 0° and 45° of FIG. 5, respectively. At 0° in FIG. 6, M DC components $C_0^0, C_0^1, \ldots, C_0^{M-1}$ of the 0° primary paths $C_0, C_1, \ldots, C_{M-1}$ of FIG. 5 constitute a secondary, path S. At 45° in FIG. 6, M DC components $C_0^1, \ldots, C_0^{M/2}, \ldots, C_0^{M-1}$ of the 45° primary path $C_0$, $C_1, \ldots, C_{M/2}, \ldots, C_{M-1}$ constitute a secondary path S.

The types and the number of coefficients to be output for an N×N block by DART as a result of the above first and second stages are as follows.

One DC coefficient (output of the secondary path)
AC coefficients output from each of the primary and secondary paths Accordingly, in terms of form, the coefficients of two-dimensional orthogonal transformation by DARE are one DC coefficient and $N^2-1$ AC coefficients, similar to the conventional separation type DCT. However, AC coefficients are divided into two types as described above. Here, the AC coefficients output from the primary path are not subjected to DCT of secondary paths.

It is generally said that the above DART method is effective when a direction with a high correlation if a block is the same as the direction of DCT performed in a primary path.

Although various related technologies have been described above, they have the following problems.

First, the video encoding method typified by H.264 or H.265 has a problem in that, as the square block size increases, the distance between a reference pixel and a pixel to be encoded increases and thus the correlation decreases, which reduces the prediction performance and thus reduces the encoding performance.

In addition, the method of FIGS. 1, and 2, which copes with the reduction of correlation by allowing for the case of a non-square block as described above, has the following problems (1) and (2).

(1) Since non-square separation type orthogonal transformation is used, a DCT is applied to a non-square block having a small number of pixels in one of the horizontal direction or the vertical direction of the non-square block. As a result, the energy compaction performance (i.e., the ability to converge energy to DC components and low frequency components) decreases in the direction with a small number of pixels (i.e., in the direction of a shorter side of the non-square block from among the shorter and longer sides thereof), reducing the encoding efficiency.

(2) Since the separation type orthogonal transformation does not utilize the directionality of an intra-frame residual signal, energy compaction performance is low.

Furthermore, since DART proposed in Non Patent Document 2 uses DCT of oblique directions, a DCT also inevitably happens for blocks with a small number of pixels as, in the case of (1) above, there is a problem which reduces the enemy compaction performance and reduces the encoding efficiency.

For example, in the case of 45° in FIG. 5, the primary path $C_{M/2}$ corresponding to the center includes a large number of N pixels (where N is a block size), but the number of pixels of a primary path decreases as it approaches an end. In particular, the number of pixels of the primary paths $C_0$ and $C_{M-1}$ at both ends is 1 and thus energy compaction performance cannot be expected.

Means for Solving the Problem

According to one aspect of the present invention, an encoding device includes a mode selection means configured to determine a block division type and an intra prediction mode of each divided block from an input image to be encoded and encoded pixels, a square intra prediction means configured to apply square intra prediction to obtain a predictive value when the determined block is square, a non-square intra prediction means configured to apply non-square intra prediction to obtain a predictive value when the determined block is non-square a differential means configured to obtain a prediction residual which is a difference between the predictive value and a corresponding input image to be encoded, a squaring means configured to rearrange prediction residuals obtained when the determined block is non-square into a square format, a transformation means configured to apply orthogonal transformation to the prediction residuals rearranged into the square format or prediction residuals obtained when the determined block is square to obtain transform coefficients, a quantization means configured to quantize the transform coefficients to obtain level values, an entropy encoding means configured to encode the level values, the determined block division type, and the determined intra prediction mode of each divided block, an inverse quantization/inverse transformation means configured to inversely quantize or inversely transform the level values to obtain reconstructed prediction residuals, a non-squaring means configured to rearrange a block of the reconstructed prediction residuals into a non-square format when the block of the reconstructed prediction residuals corresponds to a non-square format, and an addition means configured to add the predictive value to the reconstructed prediction residuals rearranged into the non-square format or the reconstructed prediction residuals obtained when the determined block is square to reconstruct the encoded pixels.

According to another aspect of the present invention, a decoding device includes an entropy decoding means configured to decode an encoded bitstream to decode a block division type, an intra prediction mode of each divided block, and level values of each block, a predictive value generation means configured to generate predictive values of a block to be decoded on the basis of decoded pixels, the decoded block division type, and the decoded intra prediction mode of each divided block, an inverse quantization/inverse transformation means configured to inversely quantize and inversely transform the level values to obtain decoded prediction residuals, a non-squaring means configured to rearrange the decoded prediction residuals from a square format into a non-square format when the decoded block division type indicates that the decoded prediction residuals are associated with a non square format, and an addition mean configured to add the predictive values to prediction residuals obtained when the decoded block division type indicates that the decoded prediction residuals are associated with a square format or to the rearranged prediction residuals to generate the decoded pixels.

Other features and advantages of the present is will be apparent from the following description given with reference to the accompanying drawings, in the accompanying drawings, the same or similar components are denoted by the same reference numerals.

EMBODIMENTS FOR CARRYING OUT THE INVENTION

Figure 7:
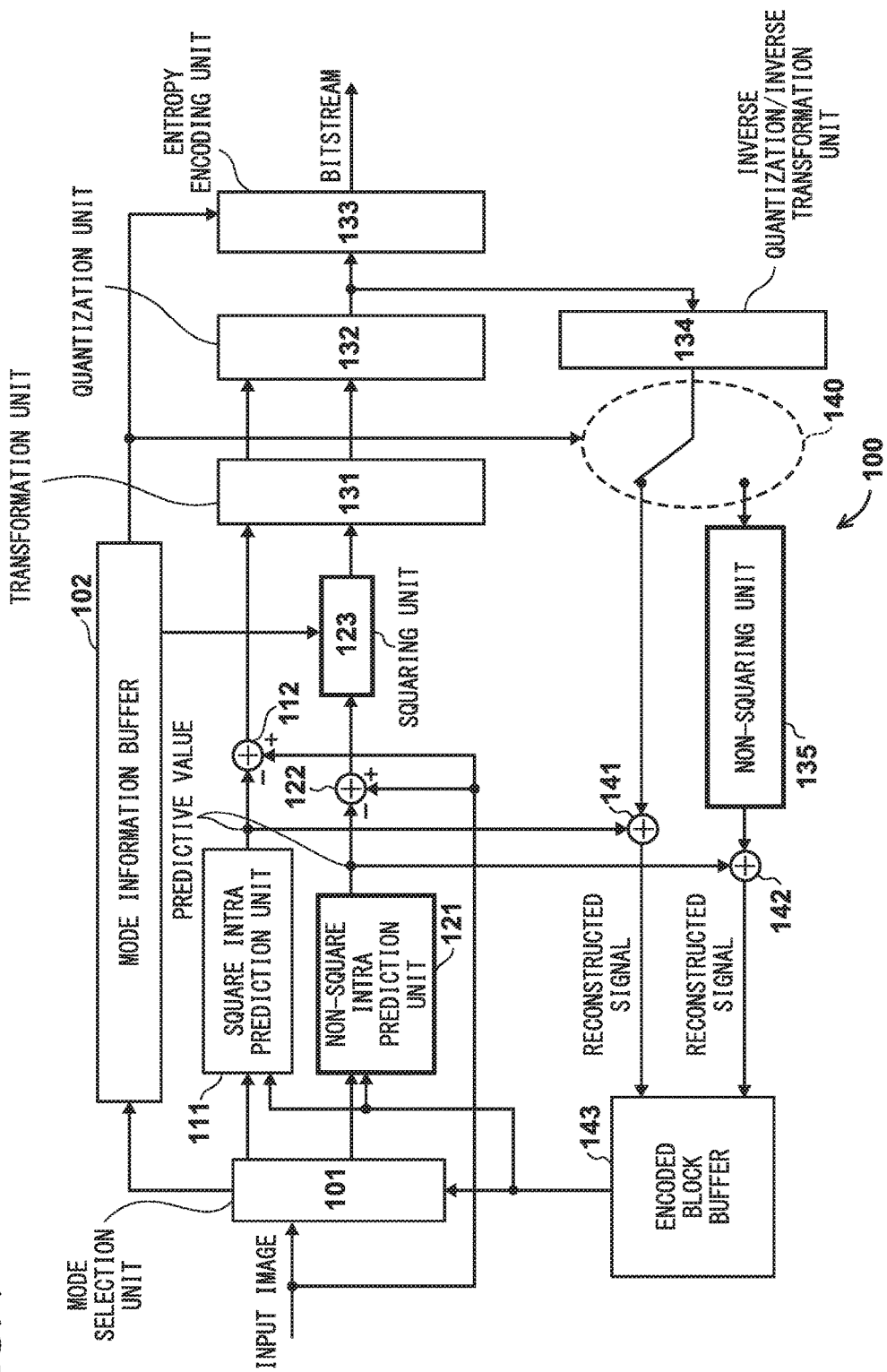
FIG. 7 is a functional block diagram of an encoding device according to an embodiment.

FIG. 7 is a functional block diagram of an encoding device according to an embodiment. The encoding device 100 includes a mode selection unit 101, a mode information buffer 102, a square intra prediction unit 111, a non-square intra prediction unit 121, differential units 112 and 122, a squaring unit 123, a transformation unit 131, a quantization unit 132, an entropy encoding unit 133, an inverse quantization/inverse transformation unit 134, a switch 140, a non-squaring unit 135, adders 141 and 142, and an encoded block buffer 143.

Figure 1:
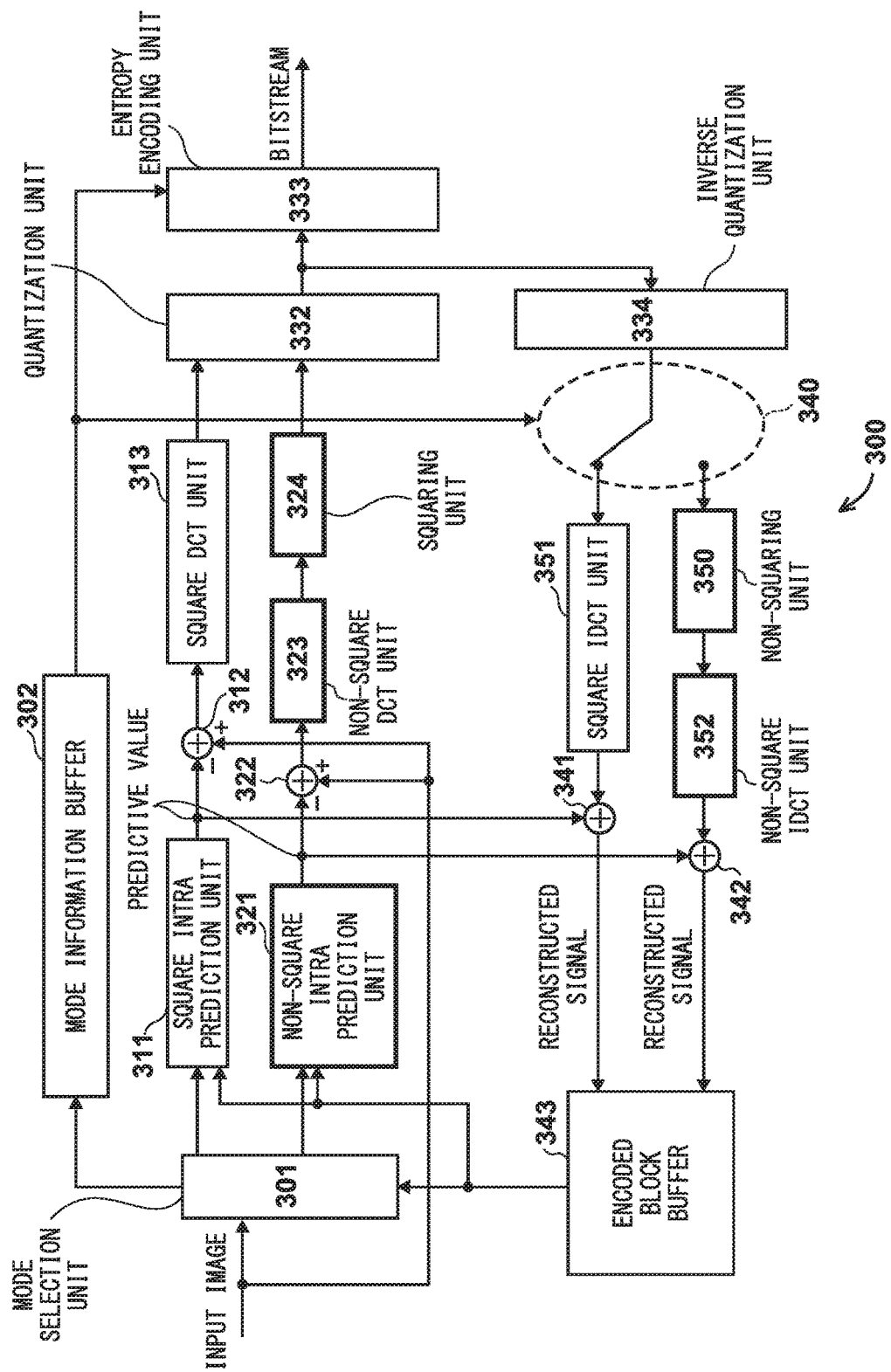
FIG. 1 is a functional block diagram of an encoding device according a related technology.
Figure 2:
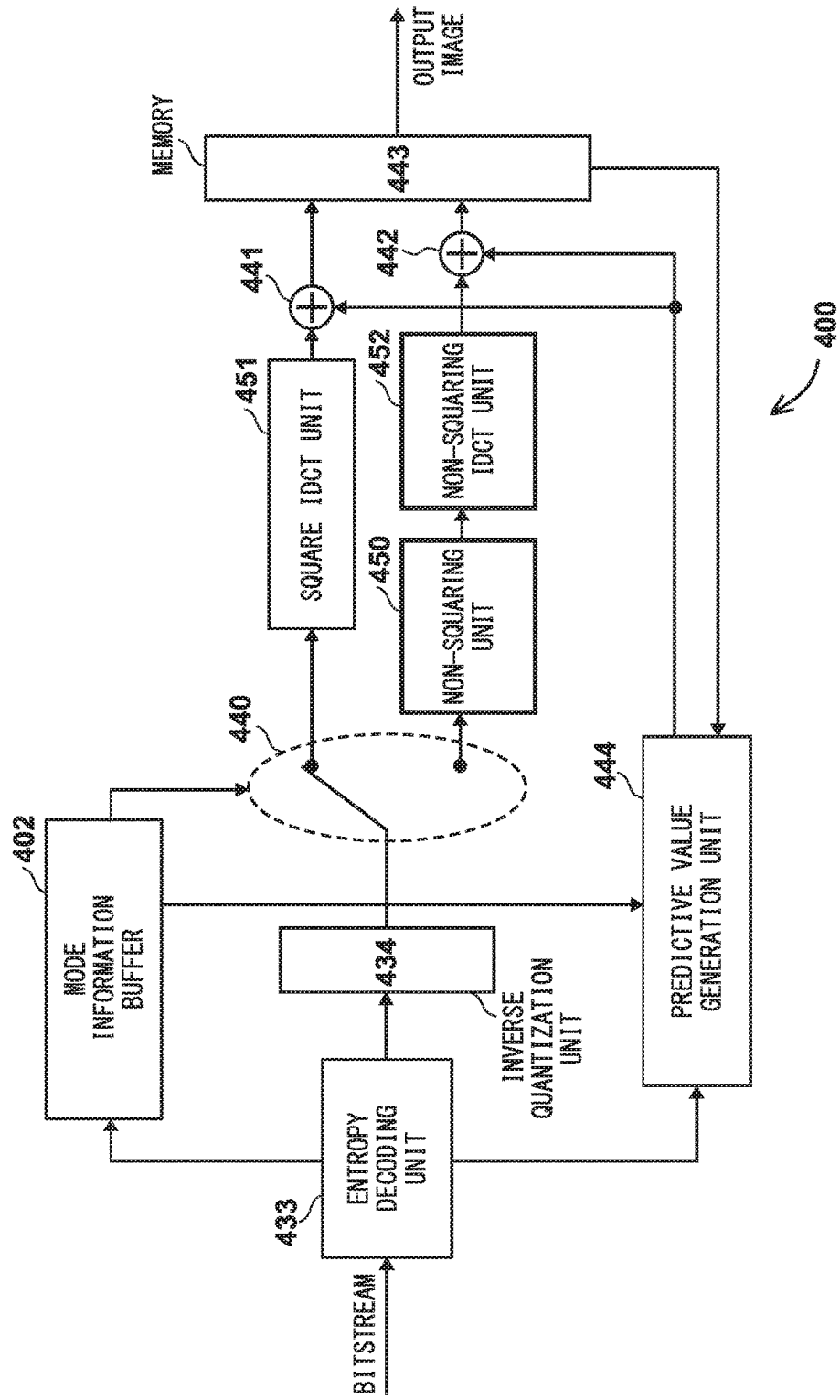
FIG. 2 is a functional block diagram of a decoding device according to the related technology.
Figure 3:
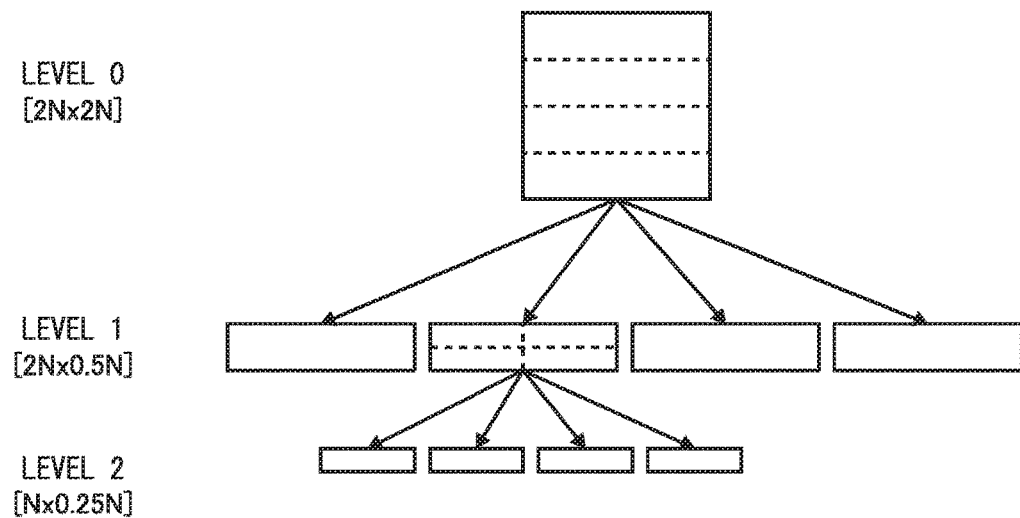
FIG. 3 is a diagram for explaining quadtree division orthogonal transformation.
Figure 4:
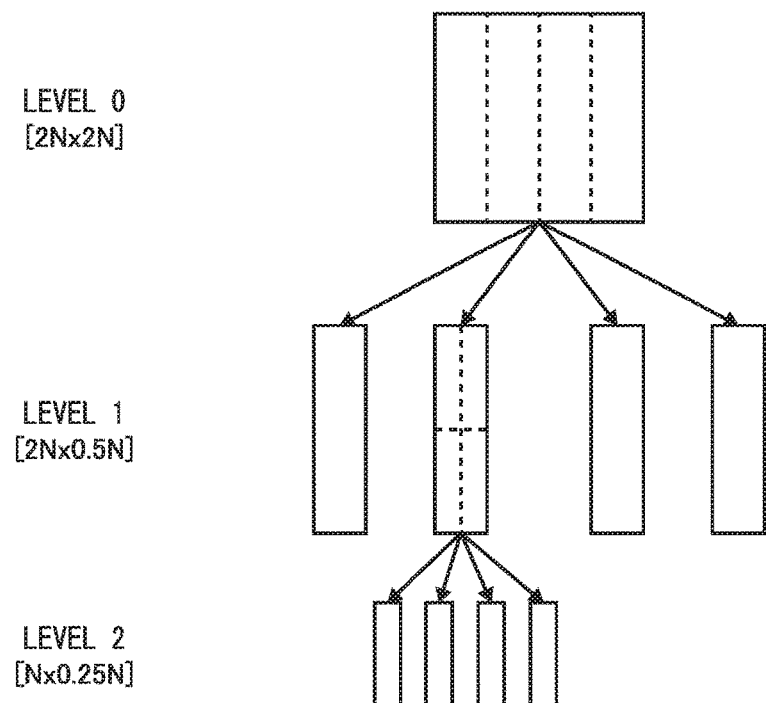
FIG. 4 is a diagram for explaining quadtree division orthogonal transformation.

Similar to the encoding device 300 of FIG. 1, the encoding device 100 in FIG. 7 selectively handles and encodes square blocks and non-square blocks in its large framework for encoding as corresponding names are assigned to the parts of the encoding device 100. However, the encoding device 100 particularly takes the following measures in order to improve the encoding efficiency by avoiding the DCT for a block with a small number of pixels, which is the problem of the related technology.

That is, when a non-square block is handled, the non-square intra prediction unit 121 obtains a predictive value of the non-square block and the differential unite 122 generates as prediction residual from the predictive value and then the squaring unit 123 scans prediction residual pixel values for the non-square block in the same direction as the prediction mode, generates a vector (which is an arrangement of residual values in one column), and converts the vector into a square format according to the arrangement order of the vector.

Therefore, even when a non-square block is handled, a rearranged square block is subjected to a DCT in the transformation unit 131 and it is thus possible to avoid a DCT for a block with a small number of pixels. It is also possible to improve the encoding efficiency by performing rearrangement to apply the DCT, taking into consideration the direction of prediction applied to the original non-square block.

Each part of the encoding device 100 of FIG. 7 will be described below. In the following description, corresponding processes and functional units in the case of a square block and a non-square block will be described in parallel appropriately using parentheses or the like, similar to the description of the encoding device 300 in FIG. 1.

The mode selection unit 101 has the same function as the mode selection unit 301 in FIG. 1 (but with a different specific manner of performing encoding in the case of a non-square block as described below) and receives, as inputs thereof, both an input image to be encoded and a reconstructed reference pixel stored in the encoded block buffer 143 and outputs a block division type (regarding whether it is square or non-square and the block size) which is applied to the block to be encoded and a prediction mode for each divided block to the mode information buffer 102. Although the mode selection unit 301 in FIG. 1 has been described with reference to 4-division, any division method such as 2-division or the like may be applied. That is, it suffices if the number of pixels of a final single block obtained, by the division is $(2n)^2$ (where n is an integer), that is, the square of an even number.

The output block division type and prediction mode can be determined on the basis of a rate distortion optimization algorithm.

The mode information buffer 102 holds the information of the block division type and each prediction mode which is to be applied and allows the switch 140 to perform signal division according to the information (signal division according to case discrimination between the case of square blocks and the case of non-square blocks), and also provides the information to the entropy encoding unit 133 which is to encode the information.

When a divided block applied to the input image is a square block, pixels of the block are input to the square intra prediction unit 111, and, when the divided block is a non-square block, pixels of the block are input to the non-square intra prediction unit 121.

The square infra prediction unit 111 (the non-square intra prediction unit 121) obtains a predictive value for a pixel of the square block (the non-square block) input as described above by referring to the reconstructed pixels in the encoded block buffer 143 according to the intra prediction mode output from the mode selection unit 101 and outputs the predictive value to the differential unit 112 (the differential unit 122).

The differential unit 112 (the differential unit 122) obtains the difference between a prediction signal input from the square intra prediction unit 111 (the non-square intra prediction unit 121) and an input pixel of the block to be encoded and outputs the difference as a prediction residual to the transformation unit 131 (the squaring unit 123).

The squaring unit 123 rearranges prediction residuals arranged as the non-square block into prediction residuals as a square block and outputs the prediction residuals to the transformation unit 131. Details of the squaring unit 123 will be described later.

The transformation unit 131 performs orthogonal transformation on the prediction residuals in the square block format output by the differential unit 112 or the squaring unit 123 and outputs transform coefficients thereof to the quantization unit 132. Here, a normal separation type of DCT may be used for the orthogonal transformation, and, for the prediction residuals in the square block format output from the squaring unit 123, DART of the above-described Non Patent Document 2 may be applied in a manner which will be described in detail later.

The quantization unit 132 quantizes the transform coefficients output from the transformation unit 131 to obtain level values and outputs the level values to the entropy encoding unit 133 and the inverse quantization/inverse transformation unit 134.

The entropy encoding unit 133 entropy-encodes the level values output from the quantization unit 132 and information of the block division type and information of the prediction mode applied to the block to be encoded stored the mode information buffer 102 and outputs a bitstream. The output bitstream is input to an entropy decoding unit 233 of a decoding device 200 in FIG. 8 which will be described later.

The inverse quantization/inverse transformation unit 134 performs the inverse of the quantization of the quantization unit 132 (i.e., inverse quantization) on the level values output from the quantization unit 132 to generate transform coefficients and performs the inverse of the processing of the transformation unit 131 (i.e., inverse transformation) on the transform coefficients to generate prediction residuals arranged in a square block format and outputs them to the switch 140.

By referring to the mode information buffer 102, the switch 140 outputs each prediction residual output from the inverse quantization/inverse transformation unit 134 to the adder 141 when the prediction residual has been obtained through the square intra prediction unit 111 (i.e., when it corresponds to a square block from the beginning). On the other hand, the switch 140 outputs the prediction residual to the non-squaring unit 135 when the prediction residual has been obtained through the non-square intra prediction unit 121 (i.e., when it has been rearranged into a square format by the squaring unit 123 although it was initially in non-square block).

The non-squaring unit 135 rearranges the prediction residuals in the square block format output from the switch 140 into the original non-square block format and outputs the prediction residuals in the non-square block format to the adder 142. The non-squaring unit 135 performs this rearrangement according to the information of the block division type held in the node information a buffer 102 in the same manner as when the switch 140 refers to the mode information buffer 102 and thus performs the inverse of the rearrangement by the the squaring unit 123.

The adder 141 (the adder 142) adds a prediction residual output from the switch 140 (the non-squaring unit 135) and a predictive value output from the square intra prediction unit 111 (the non-square intra prediction unit 121) to obtain a reconstructed signal of the block and outputs the reconstructed signal to the wooded block buffer 143.

The encoded block buffer 143 holds the reconstructed signal and provides the reconstructed signal for reference by the mode selection unit 101, the square intra prediction unit 111, and the non-square intra prediction unit 121.

Figure 8:
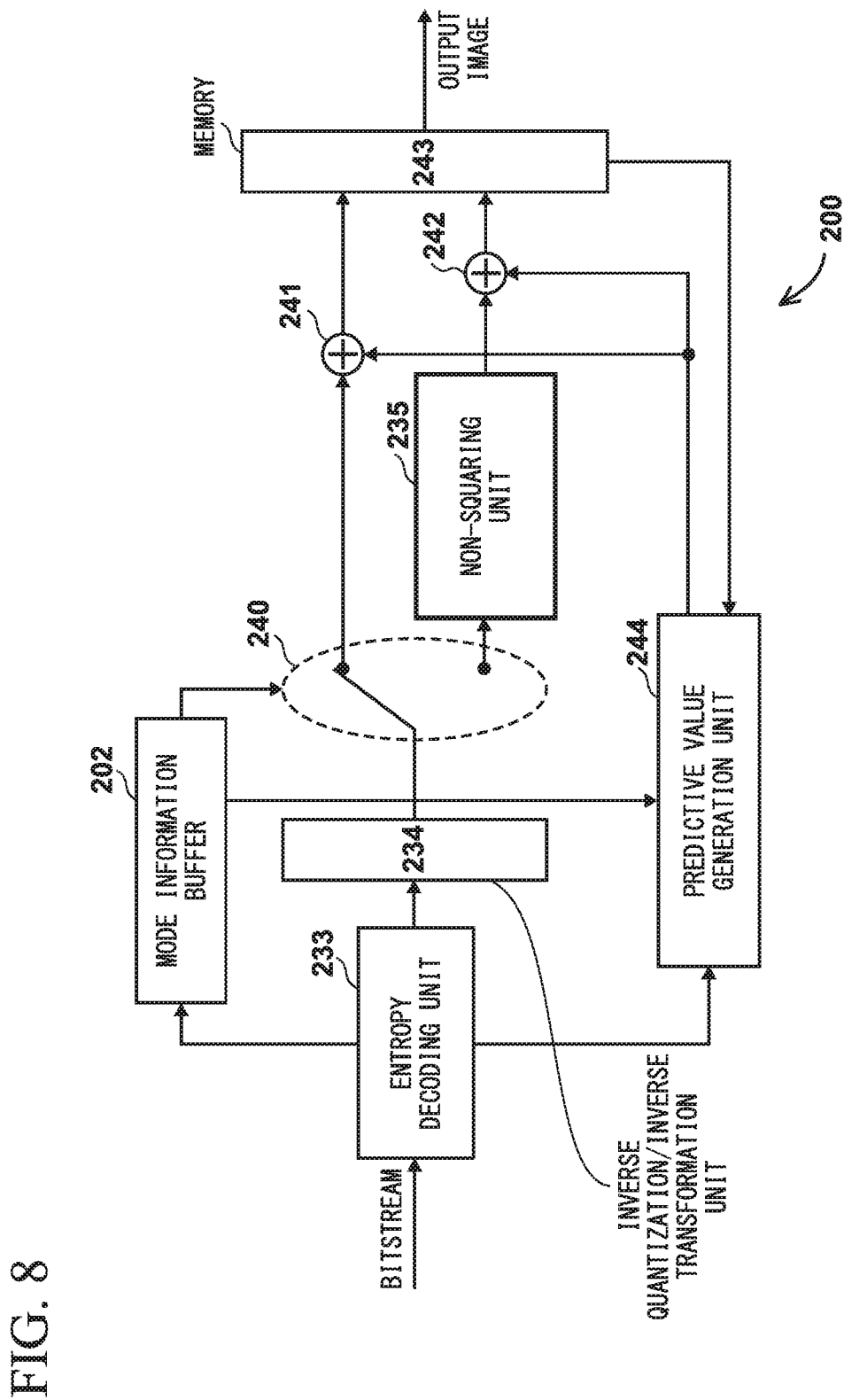
FIG. 8 is a functional block diagram of a decoding device according to an embodiment.

FIG. 8 is a functional block diagram of the decoding device 200 according to an embodiment. The decoding device 200 includes an entropy decoding unit 233, a mode information buffer 202, an inverse quantization/inverse transformation unit 234, a switch 240, a non-squaring unit 235, adders 241 and 242, a memory 243, and a predictive value generation unit 244.

By including these components, the decoding device 200 performs a process substantially corresponding to the reconstruction process of the encoding device 100 in FIG. 7 to sequentially decode an encoded bitstream. Each part of the decoding device 200 is described as follows.

The entropy decoding unit 233 entropy-decodes a bitstream output from the entropy encoding unit 133 in FIG. 7 to obtain level values and information of the block division type and the prediction mode of a block to be decoded. The decoded information of the block division type and the prediction mode is output to and held in the mode information buffer 202 and is also output to the predictive value generation unit 244. The level values are output to the inverse quantization/inverse transformation unit 234.

The inverse quantization/inverse transformation unit 234 performs the same process as the inverse quantization/inverse transformation unit 134 in FIG. 7. Specifically, the inverse quantization/inverse transformation unit 234 inversely quantizes the level values to generate transform coefficients and also inversely transforms the transform coefficients to generate prediction residuals arranged in a square format and then outputs the prediction residuals to the switch 240.

The switch 240 performs processing common to the switch 140 in FIG. 7. Specifically, by referring to information of the block division type of the block to be decoded held in the mode information buffer 202, the switch 240 outputs the prediction residuals output from the inverse quantization/inverse transformation unit 234 to the adder 241 when the block is square and outputs the prediction residuals to the non-squaring unit 235 when the block is non-square.

The non-squaring unit 235 performs processing common to the non-squaring unit 135 in FIG. 7. Specifically, the non-squaring unit 235 rearranges the prediction residuals arranged in the square block format into the original non-square block format according to the information of the non-square block held in the mode information buffer 202 and outputs the rearranged prediction residuals to the adder 242.

The adder 241 (the adder 242) adds the prediction residuals output from the switch 240 (the non-squaring unit 235) and predictive values corresponding to the prediction residuals generated by the predictive value generation unit 244 to obtain a decoded signal of the block and outputs the decoded signal to the memory 243 for storage. The memory 243 outputs the decoded signal as an output image and provides the decoded signals for reference by the predictive value generation unit 244.

The predictive value generation unit 244 refers to decoded pixels stored in the memory 243 according to the information of the prediction mode stored in the mode information buffer 202 (or decoded by the entropy decoding unit 233) to generate predictive values of the block to be decoded and outputs the predictive values to the adder 241 when the block to be decoded is a square block and outputs the predictive values to the adder 242 when the block to be decoded is a non-square block.

Hereinafter, details of a process of rearranging prediction residuals from a non-square format into a square format by the squaring unit 123 in FIG. 7 will be describe. The non-squaring unit 135 in FIG. 7 and the non-squaring unit 235 in FIG. 8 rearrange the prediction residuals from a square format into as non-square format by performing the reverse of the rearrangement of the squaring unit 123 described above.

The squaring unit can rearrange the prediction residuals into a square format according to a predetermined rule based on the size (N×M) of non-square block. The predetermined rule may be based on the prediction direction in the prediction mode which has been applied to the non-square block by the non-square intra prediction unit 121.

By prescribing the predetermined rule of rearrangement as being based on both the size of the non-square block and the prediction mode in this manner, it is possible to eliminate the need for the entropy encoding unit 133 to encode rearrangement information. That is, it is not necessary to encode rearrangement information since the non-squaring unit 235 of the decoding device 200 of FIG. 8 can uniquely specify information of the manner of rearranging from a square format into a non-square format according to information of the prediction mode and information of the size of the decoded non-square block. However, it is necessary for the decoding device 200 to previously hold the information of the predetermined rule of rearrangement based on the size of the non-square block and the prediction mode.

Figure 9:
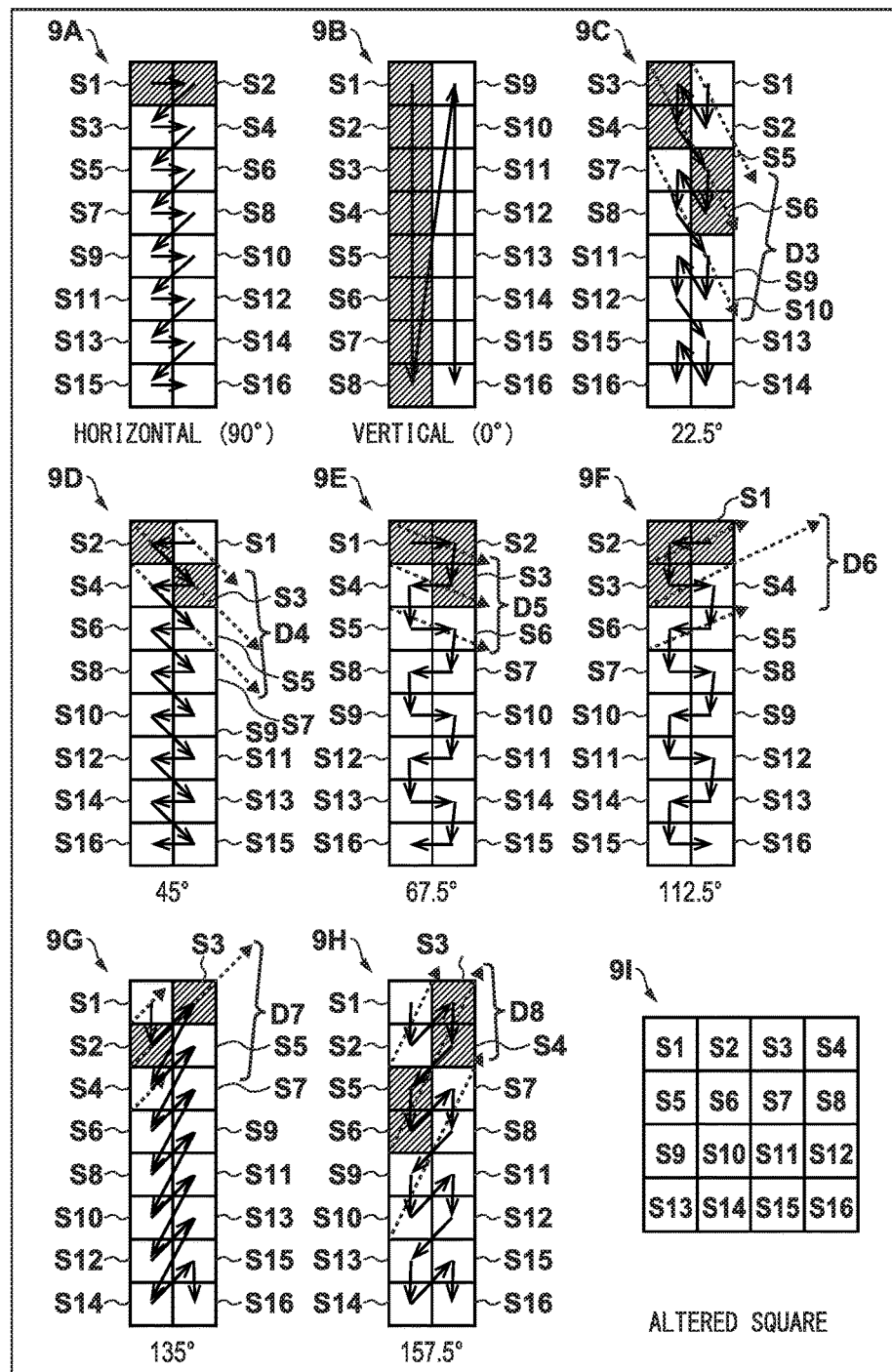
FIG. 9 is a diagram showing an example of rearrangement according to a prediction direction.

FIG. 9 is a diagram showing an example of rearrangement based on the prediction direction. Here, prediction directions 9A to 9H in FIG. 9 indicate prediction directions in the case in which the size of the non-square block is 2 horizontal-axis elements×8 vertical-axis elements and the one-dimensional scanning order for rearrangement is shown as S1 to S16. Reference numeral 9I in FIG. 9 indicates the order of rearrangement into a square format of size 4×4 according to the scan order of S1 to S16 shown in each of the prediction directions 9A to 9H.

While there is a need to set various predetermined rearrangements according to the size of the non-square block (for example, "33×8→16×16", "32×2→8×8", or "8×2→4×4"), it is possible to set a predetermined order according to the same policy as in the example of FIG. 9 (and FIGS. 10 and 11 which will be described later).

FIG. 9 shows an example in which eight types of prediction directions are defined. However, when more than eight types of prediction directions are defined more finely than this example, a predetermined order may be set with the same policy, and the closest direction of the exemplified eight types may be applied as a representative. For example, when the prediction direction is 5° or 10°, rearrangement of the prediction direction 9B may be applied since the vertical (0°) of the prediction direction 9B in FIG. 9 is the closest direction.

As shown in the example of the scan order of S1 to S16 in each prediction direction in FIG. 9, the one-dimensional scan order is preferably configured by repeating a unite scan which matches the prediction direction or is as close to the prediction direction as possible (i.e., a unit scan which reflects the prediction direction) in the non-square block. Unit scans are those shown shaded at each of the pixel positions of the size of 2 horizontal-axis elements×8 vertical-axis elements in FIG. 9.

Here, to explain the unit scan, it is assumed that coordinates with the uppermost left being (0, 0) and the lowermost right being (1, 7) are used as (integer) coordinates of a lattice point specifying a pixel position of the non-square block of 2 horizontal-axis elements×8 vertical-axis elements of FIG. 9. (Such coordinates are also used in FIG. 10 which will be described later.)

For example when the prediction direction is horizontal (90°) as shown as the prediction direction 9A, unit scans are to shaded one "S1→S2" and similarly repeated ones "S3→S4", "S5→S6", etc., which all have as displacement of $(\Delta x, \Delta y)=(+1, 0)$ and coincide with the direction of the horizontal (90°). In the case of prediction direction 9B, the prediction direction is vertical (0°) and the shaded unit scan is "S1→S2→ . . . S8", which has a displacement of $(\Delta x, \Delta y)=(0, +7)$ and coincides with the direction of the vertical (0°).

When the prediction direction is 22.5° like the prediction direction 9C, unit scans are a shaded one "S3→S4→S5→S6" and the like and have a direction D3 which substantially coincides with the prediction direction 22.5° as shown. A displacement in the direction D3 is $(\Delta x, \Delta y)=(+1, +3)$. In the case of the prediction direction 9C, scans S1, S2 and S15, S16 correspond to portions remaining at both ends in order to provide a repeating configuration of the unit scan. Also, when the prediction direction is 157.5 as shown as the prediction direction 9H, unit scans are a shaded one "S3→S4→S5→S6" and the like and a displacement in a direction D8 is $(\Delta x, \Delta y)=(-1, +3)$. These scans are the inverse of the scans of the prediction direction 9C in the x-axis direction.

When the prediction direction is 45° as shown as the prediction direction 9D, unit scans are a shaded one "S2→S3" and similar ones "S4→S5" and the like, a displacement in a direction D4 is $(\Delta x, \Delta y)=(+1, +1)$, and the scans are configured to coincide with the prediction direction of 45°. Further, in the case of the prediction direction 9D, scans S1 and S16 correspond to portions remaining at both ends. Also, also when the prediction direction is 135° as shown as the prediction direction 9G, unit scans are a shaded one "S2→S3" and similar ones "S4→S5" and the like, a displacement in a direction D7 is $(\Delta x, \Delta y)=(+1, -1)$, and the scans correspond to the scans of the prediction direction 9D.

When the prediction direction is 67.5° as shown as the prediction direction 9E, unit scans are a shaded one "S1→S2→S3" and similar ones "S5→S6→S7" and the like, a displacement in a direction D3 is $(\Delta x, \Delta y))$, and the prediction direction is configured to be close to 67.5°. In the case of the prediction direction 9E, S4, S8, etc., correspond to midway passing parts by which the scans pass in the midway for providing the repeating configuration of the unit scan. When the prediction direction is 112.5° as shown as the prediction direction 9F, unit scans are a shaded one "S1→S2→S3" and similar ones "S5→S6→S7" and the like, a displacement in a direction D6 is $(\Delta x, \Delta y)=(-1, +1)$, and the scans are the inverse of the scans of the prediction direction 9E in the x-axis direction.

It is possible to perform rearrangement into a square format by one-dimensionally scanning in a predetermined scan order of S1 to S16 according to each prediction direction as shown in FIG. 9 as described above and then scanning in a horizontal direction four times according to the order denoted by reference numeral 9I.

Figure 5:
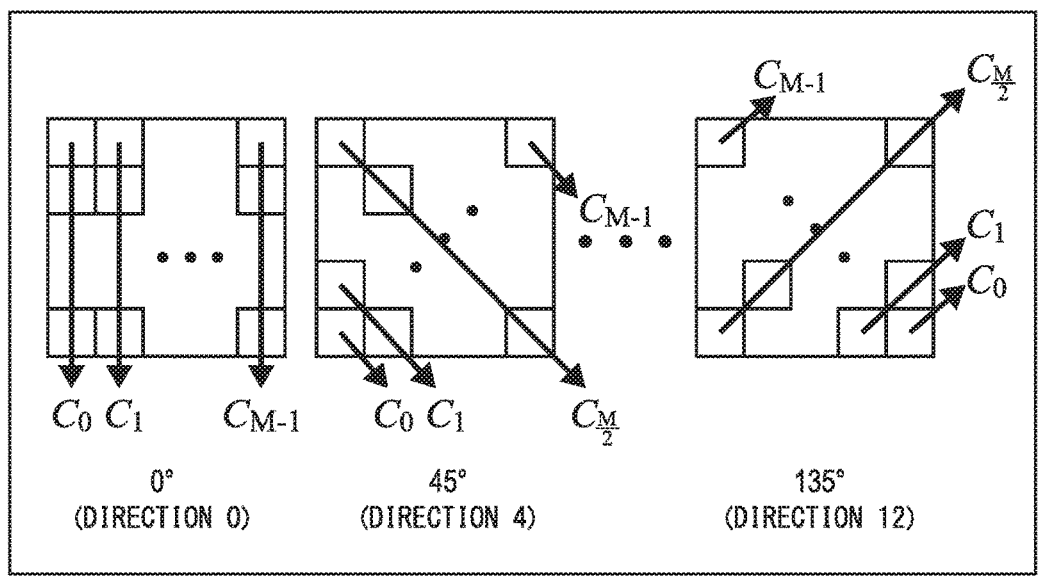
FIG. 5 is a diagram showing exemplary primary paths in direction adaptive residual transformation.
Figure 6:
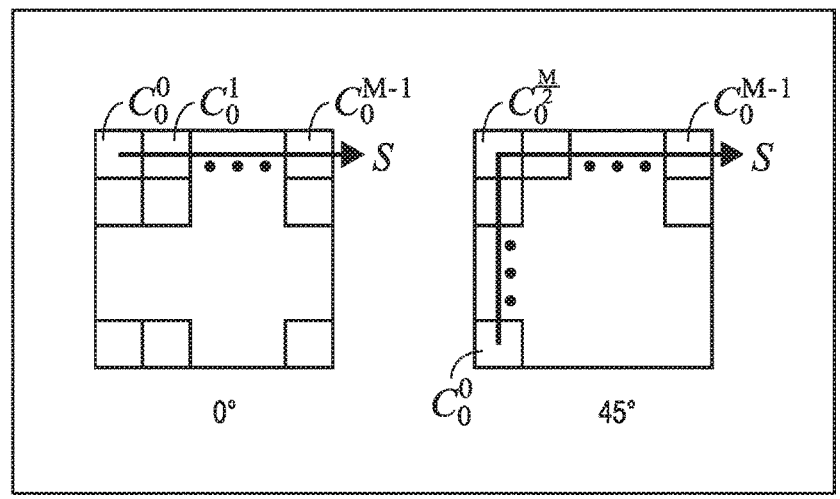
FIG. 6 is a diagram showing exemplary secondary paths in direction adaptive residual transformation.

For the rearranged square prediction residuals denoted by reference numeral 9I, DART described above with reference to Non Patent Document 2 may be applied to the transformation unit 131 in FIG. 7. In this case, a primary path of the first stage may be applied in a horizontal direction and a secondary path of the second stage may be applied in a vertical direction. By performing as one-dimensional DCT in the horizontal and vertical directions, it is possible to exclude the use of a one-dimensional DCT in an oblique direction in which the number of DCT coefficients is reduced as described above with reference to FIGS. 5 and 6 and thus to expect an improvement in the encoding efficiency.

In the example denoted by reference numeral 9I in FIG. 9, arranging in the horizontal direction is repeated the same number of times as the number of elements in the vertical direction and therefore the primary path is set in the horizontal direction and the secondary path is set in the vertical direction. On the contrary, arranging in the vertical direction may be repeated the same number of times as the number of elements in the horizontal direction so as to rearrange them into a square format. In this case, the primary path may be set in the vertical direction and the secondary path may be set in the horizontal direction.

In the case in which the prediction directions are 22.5° and 157.5° shown as the prediction directions 9C and 9H as another embodiment of the rearrangement by the squaring unit 123, a well-known interlaced scanning method (alternate scanning in a vertical direction) may be applied.

Figure 10:
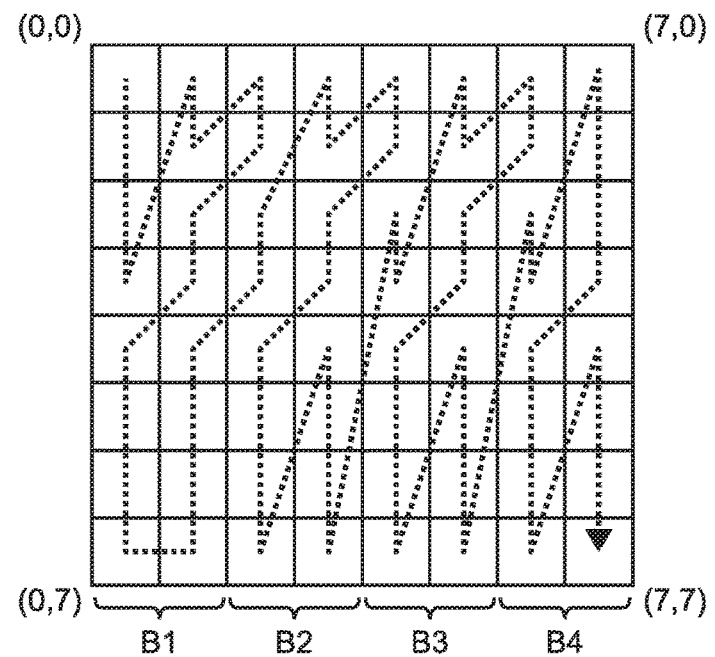
FIG. 10 is a diagram showing alternate scanning in a vertical direction.

FIG. 10 is a view showing the alternate scanning applied in the vertical direction, where scanning of portions B1 to B4 having the same size of 2×8 may be applied for each of the 4 divided blocks of the size of 2×8. In this case, scanning is applied to the entirety of the shown 8×8 square block. For example, in the middle of the block B1, there are parts (2, 0) and (2, 1) which are so-called "flying off" to the block B2, but the parts (2, 0) and (2, 1) of the block B2 may be scanned in this order. That is, the block B1 is not all continuously scanned.

Similarly, in the case in which the prediction directions are 67.5° and 112.5° shown as the prediction direction diagrams 9E and 9F as another embodiment of the rearrangement of the squaring unit 123, a well-known interlaced scanning method (alternate scanning in a horizontal direction) may be applied.

Figure 11:
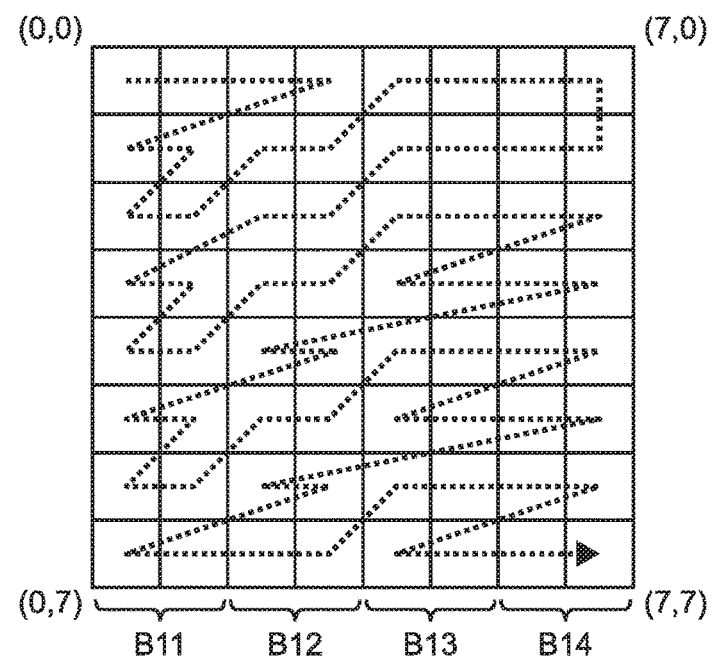
FIG. 11 is a diagram showing alternate scanning in a horizontal direction.

FIG. 11 is a diagram showing the alternate scanning applied in the horizontal direction, where scanning of portions B11 to B14 having the same size of 2×8 may be applied for each of the 4 divided blocks of the size of 2×8. In this case, scanning is applied to the entirety of the shown 8×8 square block in the same manner as described above with reference to FIG. 10.

Further, the following rearrangement may be performed as another embodiment of the rearrangement of the squaring unit 123. That is, in FIG. 9, S1 to S16 are arranged in a square format uniformly irrespective of the prediction direction as shown by reference numeral 9I after they are one-dimensionally arranged in the scan order corresponding to each prediction direction. However, alternatively, it is also possible to apply rearrangement into a square format in accordance with the prediction direction.

In particular, rearrangement may be applied such that lines of the square (lines in the horizontal direction in the example of reference number 9I) start at start positions of unit scans. In this case, a predetermined rule with the following criteria to be met may be used as a rule of rearrangement. That is, the criteria is that start positions of the lines of the square coincide with as many start positions of unit scans as possible (where the "start positions" refer to positions with the smallest value of the horizontal direction x in the image coordinates (x, y) and correspond to the positions of S1, S5, S9, and S13 in the example of reference numeral 9I) and the one-dimensional arrangement of scans S1 to S16 is altered as little as possible (such that, when raster scan is applied to the rearranged square, the arrangement of S1 to S16 is altered as little as possible).

By ensuring that start positions of the lines of the square coincide with as many start positions of unit scans as possible according to the criteria, it is possible to improve the energy compaction performance at the time of orthogonal transformation and thus to improve the encoding efficiency. This is because the unit scans are configured to be in an arrangement which coincides with or is close to the prediction direction.

Figure 12:
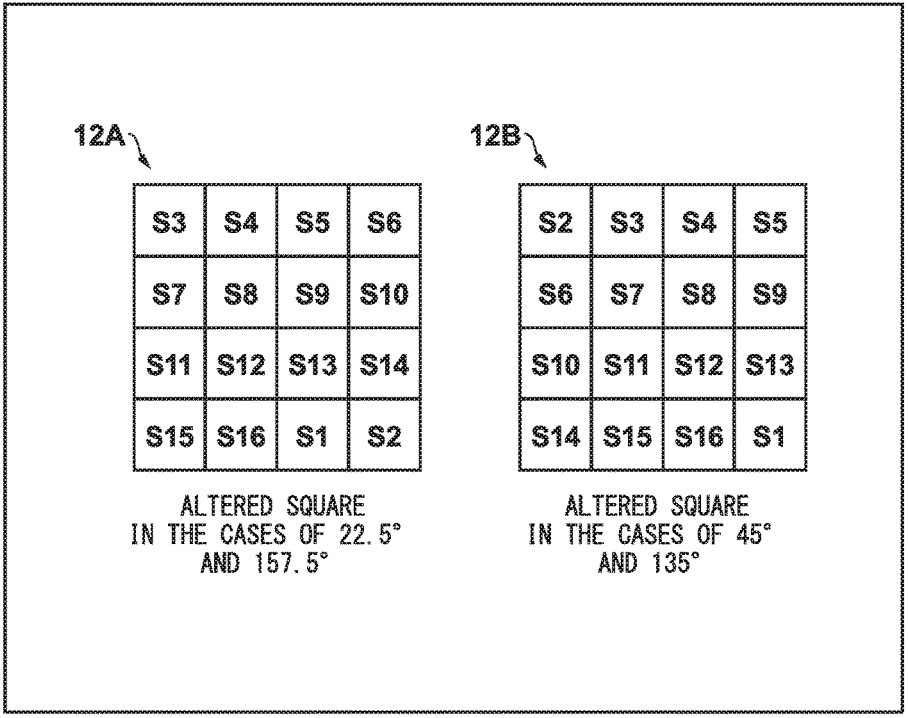
FIG. 12 is a diagram showing another example of rearrangement into a square format.

FIG. 12 shows an example of another embodiment of rearrangement into a square format as an example which meets the criteria.

In an example donated by reference numeral 12A in FIG. 12, when the prediction directions are 22.5° and 157.5° (i.e., in the case of prediction directions 9C and 9H), rearrangement is performed such that lines in the horizontal direction of the rearranged square start with a unit scan "S3, S4, S5, S6" and the like. That is, the 1st to 3rd rows of the square (where lines in the horizontal direction are referred to as "rows") are configured with "S3 to S6", "S7 to S10", and "S11 to S14" which are unit scans and the 4th row is configured with "S15, S16" following the third row and "S1, S2" corresponding to the above-mentioned "remaining parts".

In an example denoted by reference numeral 12B in FIG. 13, when the prediction directions are 45° and 135° (i.e., in the case of prediction directions 9D and 9G), rearrangement is performed such that lines in the horizontal direction of the rearranged square start with unit scans "S2, S3", "S6, S7", or the like. That is, the 1st to 3rd rows of the square are configured with "S2, S3 and S4, S5". "S6, S7 and S8, S9", "S10, S11 and S12, S13" which are unit scans and the 4th row is configured with "S14, S15" which is a unit scan, "S16" following this, and "S1" corresponding to the above-mentioned "remaining part".

Also when the rearrangement of FIG. 12 is applied, the arrangement of reference numeral 9I in FIG. 9 may be adopted in the case of prediction directions 9A, 9B, 9E, and 9F. Here, in the case of each of the prediction direction 9E (67.5°) and the prediction direction 9F (112.5°), S4, S8, S12 and S16 correspond to the above-mentioned "midway passing parts" for repeating the unit scans S1 to S3 and the like, but S4, S8, S12 and S16 are arranged directly following the unit scans according to the criteria that the one-dimensional arrangement of scans S1 to S14 is changed as little as possible, thus adopting the arrangement denoted by reference numeral 9I in FIG. 9.

As described above, according to the present invention, by introducing an operation of rearranging a non-square format into a square format on the basis of the correlation of prediction residual signals before orthogonal transformation, it is possible to improve the energy compaction performance of orthogonal transform coefficients and thus to improve the encoding efficiency. In addition, it is possible to increase the speed of processing since the rearrangement into a square format ensures that the processes after orthogonal transformation con be shared by square/non-square blocks. Further, since it is not necessary to send (encode/decode) scan information for rearrangement and the number of pixels in a block is not changed, the present invention can be applied to encoding and decoding devices which operate in units of conventional square blocks. The present invention can be applied to encoding and decoding of images (which are images included in video images (i.e., moving images) or still images).

The present invention can also be provided as a program that causes a computer to function as all or an arbitrary part of the encoding device 100 and/or the decoding deice 200. A well-known hardware configuration such as a central processing unit (CPU), a memory, and various I/Fs may be adopted for the computer, and the CPU executes instructions corresponding to the function of each of the units of the encoding device 100 and/or the decoding device 200.

The present invention is not limited to the above embodiments, and various changes and modifications are possible without departing from the spirit and scope of the present invention. Accordingly, the following claims are attached to publicize the scope of the present invention.

This application claims priority based on Japanese Patent Application No. 2015-038593 filed on Feb. 27, 2015, the entire disclosure of which is hereby incorporated by reference.

The invention claimed is:

1. An encoding device comprising:
   a mode selection processor configured to determine a block division type and an intra prediction mode of each divided block on the basis of an input image to be encoded and encoded pixels;
   a square intra prediction processor configured to apply square intra prediction to obtain a predictive value when the determined block is square;
   a non-square intra prediction processor configured to apply non-square intra prediction to obtain a predictive value when the determined block is non-square;
   a differential processor configured to obtain a prediction residual which is a difference between the predictive value and a corresponding input image to be encoded;
   a squaring processor configured to rearrange prediction residuals obtained when the determined block is non-square into a square format;
   a transformation processor configured to apply orthogonal transformation to the prediction residuals rearranged into the square format or prediction residuals obtained when the determined block is square to obtain transform coefficients;
   a quantization processor configured to quantize the transform coefficients to obtain level values;
   an entropy encoding processor configured to encode the level values, the determined block division type, and the determined intra prediction mode of each divided block;
   an inverse quantization/inverse transformation processor configured to inversely quantize and inversely transform the level values to obtain reconstructed prediction residuals;
   a non-squaring processor configured to rearrange a block of the reconstructed prediction residuals into a non-square format when the block of the reconstructed prediction residuals corresponds to the non-square format; and an addition processor configured to add the predictive value to the reconstructed prediction residuals rearranged into the non-square format or the reconstructed prediction residuals obtained when the determined block is square to reconstruct the encoded pixels.

2. The encoding device according to claim 1, wherein the squaring processor and the non-squaring processor are configured to perform the rearrangement in a predetermined order based on a direction of the intra prediction mode applied by the non-square intra prediction processor.

3. The encoding device according to claim 2, wherein the squaring processor is configured to order prediction residuals by repeating a unit scan, in which the direction of the intra prediction mode applied by the non-square intra prediction processor is reflected, in a non-square block and to arrange the ordered prediction residuals in a predetermined order into the square format to rearrange the ordered prediction residuals into the square format, and the non-squaring processor is configured to perform rearrangement which is an inverse of the rearrangement into the square format by the squaring processor to perform rearrangement into the non-square format.

4. The encoding device according to claim 3, wherein the predetermined order in which the ordered prediction residuals are rearranged into the square format by the squaring processor is a predetermined order based on the direction of the intra prediction mode applied by the non-square intra prediction processor.

5. The encoding device according to claim 1, wherein the transformation processor is configured to obtain a series of first coefficients by performing a series of one-dimensional orthogonal transformation on the prediction residuals rearranged into the square format along a first direction and to perform one-dimensional orthogonal transformation on direct current components of the series of first coefficients along a second direction orthogonal to the first direction.

6. A decoding device comprising:

an entropy decoding processor configured to decode an encoded bitstream to decode a block division type, an intra prediction mode of each divided block, and level values of each block;

a predictive value generation processor configured to generate predictive values of a block to be decoded on the basis of decoded pixels, the decoded block division type, and the decoded intra prediction mode of each divided block;

an inverse quantization/inverse transformation processor configured to inversely quantize and inversely transform the level values to obtain decoded prediction residuals;

a non-squaring processor configured to rearrange the decoded prediction residuals from a square format into a non-square format when the decoded block division type indicates that the decoded prediction residuals are associated with the non-square format; and an addition processor configured to add the predictive values to prediction residuals obtained when the decoded block division type indicates that the decoded prediction residuals are associated with the square format or to the rearranged prediction residuals to generate the decoded pixels.

7. The decoding device according to claim 6, wherein the non-squaring processor is configured to perform the rearrangement in a predetermined order based on a direction of the decoded intra prediction mode.

8. The decoding device according to claim 7, wherein, when the decoded block division type indicates that the decoded prediction residuals are associated with the non-square format, the prediction residuals are generated by repeating a unit scan, in which the direction of the applied intra prediction mode is reflected, in a non-square block to order prediction residuals and then arranging the ordered prediction residuals in a predetermined order into the square format, and the non-squaring processor is configured to perform rearrangement, which is an inverse of the rearrangement into the square format when the prediction residuals are generated, to perform rearrangement into the non-square format.

9. The decoding device according to claim 8, wherein the predetermined order in which the ordered prediction residuals are rearranged into the square format is a predetermined order based on the direction of the applied intra prediction mode.

* * * * *